(12) United States Patent
Koenig et al.

(10) Patent No.: US 6,883,394 B2
(45) Date of Patent: Apr. 26, 2005

(54) METHOD FOR CONTROLLING THE POSITIONING OF THE SYNCHRONIZERS OF A DUAL CLUTCH TRANSMISSION

(75) Inventors: Melissa Koenig, Howell, MI (US); Darren Firth, Parramatta (AU); Mark Buchanan, Rochester Hills, MI (US)

(73) Assignee: BorgWarner, Inc., Auburn Hills, MI (US)

(*) Notice: Subject to any disclaimer, the term of this patent is extended or adjusted under 35 U.S.C. 154(b) by 0 days.

(21) Appl. No.: 10/271,425

(22) Filed: Oct. 15, 2002

(65) Prior Publication Data

US 2004/0069082 A1 Apr. 15, 2004

(51) Int. Cl.[7] .............................................. F16H 63/00
(52) U.S. Cl. ............................ 74/335; 74/330; 74/331
(58) Field of Search .......................... 74/335, 330, 331

(56) References Cited

U.S. PATENT DOCUMENTS

| | | | |
|---|---|---|---|
| 3,589,483 A | 6/1971 | Smith | 192/3.52 |
| 4,461,188 A | 7/1984 | Fisher | 74/330 |
| 4,513,631 A | 4/1985 | Koivunen | 74/360 |
| 4,544,057 A | 10/1985 | Webster et al. | 192/0.076 |
| 4,766,774 A * | 8/1988 | Tamai | 74/473.12 |
| 4,827,784 A | 5/1989 | Muller et al. | 74/330 |
| 4,911,031 A * | 3/1990 | Yoshimura et al. | 74/335 |
| 5,662,198 A | 9/1997 | Kojima et al. | 192/87.11 |
| 5,711,409 A | 1/1998 | Murata | 192/87.11 |
| 5,720,203 A | 2/1998 | Honda et al. | 74/325 |
| 5,890,392 A | 4/1999 | Ludanek et al. | 74/331 |
| 5,915,512 A | 6/1999 | Adamis et al. | 192/3.61 |
| 5,950,781 A | 9/1999 | Adamis et al. | 192/3.61 |
| 5,966,989 A | 10/1999 | Reed, Jr. et al. | 74/331 |
| 5,979,257 A | 11/1999 | Lawrie | 74/335 |
| 6,006,620 A | 12/1999 | Lawrie et al. | 74/335 |
| 6,012,561 A | 1/2000 | Reed, Jr. et al. | 192/48.2 |
| 6,044,719 A | 4/2000 | Reed, Jr. et al. | 74/330 |
| 6,164,149 A * | 12/2000 | Ohmori et al. | 74/336 R |
| 6,227,063 B1 * | 5/2001 | Ohmori et al. | 74/335 |
| 6,276,224 B1 * | 8/2001 | Ueda et al. | 74/335 |
| 6,286,381 B1 | 9/2001 | Reed, Jr. et al. | 74/336 |
| 6,295,884 B1 * | 10/2001 | Miyake et al. | 74/335 |
| 6,364,809 B1 | 4/2002 | Cherry | 477/86 |
| 6,389,916 B1 * | 5/2002 | Fukuda | 74/335 |
| 6,427,550 B1 * | 8/2002 | Bowen | 74/336 R |
| 6,463,821 B1 * | 10/2002 | Reed et al. | 74/330 |
| 6,490,944 B1 * | 12/2002 | Heinzel et al. | 74/335 |
| 6,619,152 B1 * | 9/2003 | Ochi et al. | 74/335 |
| 6,638,197 B1 * | 10/2003 | Ogawa et al. | 477/174 |

FOREIGN PATENT DOCUMENTS

GB    2 036 203    11/1980

* cited by examiner

Primary Examiner—Rodney H. Bonck
Assistant Examiner—David D. Le
(74) Attorney, Agent, or Firm—Bliss McGlynn, P.C.; Greg Dziegielewski

(57) ABSTRACT

A method of controlling the positioning of the synchronizers of a dual clutch transmission having a plurality of synchronizers to selectively engage and disengage various gears sets, and a plurality of shift actuators adapted to move the synchronizers. The method includes the steps of initiating a control routine to move a synchronizer to a full engagement position with a gear set and monitoring the positions of all engaged synchronizers. The method also includes reinitiating the control routine to move a synchronizer back into the full engagement position when any engaged synchronizer slips out to a minimum engagement position. Further, the method includes initiating a control routine to move a synchronizer to a neutral position and monitoring the position of all disengaged synchronizers. Also, reinitiating the control routine to move a synchronizer back to the neutral position when any disengaged synchronizer drifts beyond a pre-determined neutral hysteresis position.

20 Claims, 7 Drawing Sheets

METHOD FOR CONTROLLING THE POSITIONING OF THE SYNCHRONIZERS OF A DUAL CLUTCH TRANSMISSION

BACKGROUND OF THE INVENTION

1. Field of the Invention

The present invention relates, generally to the control of a dual clutch transmission and, more specifically, to a method for actively controlling the positioning of the synchronizers of a dual clutch transmission for use in a motor vehicle driveline.

2. Description of the Related Art

Generally speaking, land vehicles require a powertrain consisting of three basic components. These components include a power plant (such as an internal combustion engine), a power transmission, and wheels. The power transmission component is typically referred to simply as the "transmission." Engine torque and speed are converted in the transmission in accordance with the tractive-power demand of the vehicle. Presently, there are two typical transmissions widely available for use in conventional motor vehicles. The first, and oldest type is the manually operated transmission. These transmissions include a foot operated start-up or launch clutch to engage and disengage the driveline with the power plant and a gearshift lever to selectively change the gear ratios within the transmission. When driving a vehicle having a manual transmission, the driver must coordinate the operation of the clutch pedal, the gearshift lever and the accelerator pedal to achieve a smooth and efficient shift from one gear to the next. The structure of a manual transmission is simple and robust and provides good fuel economy by having a direct power connection from the engine to the final drive wheels of the vehicle. Additionally, since the operator is given complete control over the timing of the shifts, the operator is able to dynamically adjust the shifting process so that the vehicle can be driven most efficiently. The disadvantages of the manual transmission is that there is an interruption in the drive connection during gear shifting and that there is a great deal of required physical interaction on the part of the operator to shift gears.

The second, and newer choice for the transmission of power in a conventional motor vehicle is an automatic transmission. First and foremost, automatic transmissions offer ease of operation. The driver of a vehicle having an automatic transmission is not required to use both hands, one for the steering wheel and one for the gearshift, and both feet, one for the clutch and one for the accelerator and brake pedal in order to safely operate the vehicle. In addition, an automatic transmission provides greater convenience in stop and go situations, because the driver is not concerned about continuously shifting gears to adjust to the ever-changing speed of traffic. Although conventional automatic transmissions avoid an interruption in the drive connection during gear shifting, they suffer from the disadvantage of reduced efficiency because of the need for hydrokinetic devices, such as torque converters, interposed between the output of the engine and the input of the transmission for transferring kinetic energy therebetween.

More specifically, torque converters typically include impeller assemblies that are operatively connected for rotation with the torque input from an internal combustion engine, a turbine assembly that is fluidly connected in driven relationship with the impeller assembly and a stator or reactor assembly. These assemblies together form a substantially toroidal flow passage for kinetic fluid in the torque converter. Each assembly includes a plurality of blades or vanes that act to convert mechanical energy to hydrokinetic energy and back to mechanical energy. The stator assembly of a conventional torque converter is locked against rotation in one direction but is free to spin about an axis in the direction of rotation of the impeller assembly and turbine assembly. When the stator assembly is locked against rotation, the torque is multiplied by the torque converter. During torque multiplication, the output torque is greater than the input torque for the torque converter. However, when there is no torque multiplication, the torque converter becomes a fluid coupling. Fluid couplings have inherent slip. Torque converter slip exists when the speed ratio is less than 1.0 (RPM input>than RPM output of the torque converter). The inherent slip reduces the efficiency of the torque converter.

While torque converters provide a smooth coupling between the engine and the transmission, the slippage of the torque converter results in a parasitic loss, thereby decreasing the efficiency of the entire powertrain. Further, the torque converter itself requires pressurized hydraulic fluid in addition to any pressurized fluid requirements for the actuation of the gear shifting operations. This means that an automatic transmission must have a large capacity pump to provide the necessary hydraulic pressure for both converter engagement and shift changes. The power required to drive the pump and pressurize the fluid introduces additional parasitic losses of efficiency in the automatic transmission.

In an ongoing attempt to provide a vehicle transmission that has the advantages of both types of transmissions with fewer of the drawbacks, combinations of the traditional "manual" and "automatic" transmissions have evolved. Most recently, "automated" variants of conventional manual transmissions have been developed which shift automatically without any input from the vehicle operator. Such automated manual transmissions typically include a plurality of power-operated actuators that are controlled by a transmission controller or some type of electronic control unit (ECU) to automatically shift synchronized clutches that control the engagement of meshed gear wheels traditionally found in manual transmissions. The design variants have included either electrically or hydraulically powered actuators to affect the gear changes. However, even with the inherent improvements of these newer automated transmissions, they still have the disadvantage of a power interruption in the drive connection between the input shaft and the output shaft during sequential gear shifting. Power interrupted shifting results in a harsh shift feel which is generally considered to be unacceptable when compared to smooth shift feel associated with most conventional automatic transmissions.

To overcome this problem, other automated manual type transmissions have been developed which can be power-shifted to permit gearshifts to be made under load. Examples of such power-shifted automated manual transmissions are shown in U.S. Pat. No. 5,711,409 issued on Jan. 27, 1998 to Murata for a Twin-Clutch Type Transmission, and U.S. Pat. No. 5,966,989 issued on Apr. 04, 2000 to Reed, Jr. et al for an Electro-mechanical Automatic Transmission having Dual Input Shafts. These particular variant types of automated manual transmissions have two clutches and are generally referred to simply as dual, or twin, clutch transmissions. The dual clutch structure is most often coaxially and cooperatively configured so as to derive power input from a singular engine flywheel arrangement. However, some designs have a dual clutch assembly that is coaxial but with the clutches located on opposite sides of the transmissions body and having different input sources. Regardless, the layout is the equivalent of having two transmissions in one housing, namely one power transmission assembly on each of two input shafts concomitantly driving one output shaft. Each transmission can be shifted and clutched independently. In this manner, uninterrupted power upshifting and downshifting between gears, along with the high mechanical efficiency of a manual transmission is available in an automatic transmission form. Thus, significant increases in fuel economy and vehicle performance may be achieved through the effective use of certain automated manual transmissions.

The dual clutch transmission structure may include two dry disc clutches each with their own clutch actuator to control the engagement and disengagement of the two-clutch discs independently. While the clutch actuators may be of the electromechanical type, since a lubrication system within the transmission is still a necessity requiring a pump, some dual clutch transmissions utilize hydraulic shifting and clutch control. These pumps are most often gerotor types, and are much smaller than those used in conventional automatic transmissions because they typically do not have to supply a torque converter. Thus, any parasitic losses are kept small. Shifts are accomplished by engaging the desired gear prior to a shift event and subsequently engaging the corresponding clutch. With two clutches and two inputs shafts, at certain times, the dual clutch transmission may be in two different gear ratios at once, but only one clutch will be engaged and transmitting power at any given moment. To shift to the next higher gear, first the desired gears on the input shaft of the non-driven clutch assembly are engaged, then the driven clutch is released and the non-driven clutch is engaged.

This requires that the dual clutch transmission be configured to have the forward gear ratios alternatingly arranged on their respective input shafts. In other words, to perform up-shifts from first to second gear, the first and second gears must be on different input shafts. Therefore, the odd gears will be associated with one input shaft and the even gears will be associated with the other input shaft. In view of this convention, the input shafts are generally referred to as the odd and even shafts. Typically, the input shafts transfer the applied torque to a single counter shaft, which includes mating gears to the input shaft gears. The mating gears of the counter shaft are in constant mesh with the gears on the input shafts. The counter shaft also includes an output gear that is meshingly engaged to a gear on the output shaft. Thus, the input torque from the engine is transferred from one of the clutches to an input shaft, through a gear set to the counter shaft and from the counter shaft to the output shaft.

Gear engagement in a dual clutch transmission is similar to that in a conventional manual transmission. One of the gears in each of the gear sets is disposed on its respective shaft in such a manner so that it can freewheel about the shaft. A synchronizer is also disposed on the shaft next to the freewheeling gear so that the synchronizer can selectively engage the gear to the shaft. To automate the transmission, the mechanical selection of each of the gear sets is typically performed by some type of actuator that moves the synchronizers. A reverse gear set includes a gear on one of the input shafts, a gear on the counter shaft, and an intermediate gear mounted on a separate counter shaft meshingly disposed between the two so that reverse movement of the output shaft may be achieved.

While these power-shift dual clutch transmissions overcome several drawbacks associated with conventional transmissions and the newer automated manual transmissions, it has been found that controlling and regulating the automatically actuated dual clutch transmissions is a complicated matter and that the desired vehicle occupant comfort goals have not been achievable in the past. There are a large number of events to properly time and execute within the transmission for each shift to occur smoothly and efficiently. To this point, conventional control schemes and methods have generally failed to provide this capability. Accordingly, there exists a need in the related art for better methods of controlling the operation of dual clutch transmissions.

One particular area of control improvement that is needed is in the positioning of the synchronizers used to move and actuate the engagement of the particular gear sets within the transmission. Current control methods have the general capability to engage and disengage the synchronizers as needed. However, they lack the ability to finely move the synchronizers with the high degree of accuracy needed for smooth transmission operation. Additionally, the manual style synchronizers of the dual clutch transmission require specialized monitoring and control to prevent the engaged synchronizers from drifting out of full engagement and working free while transferring torque, as well as to prevent the neutralized synchronizers from drifting out of their neutral positions into un-commanded contact causing interference and damage to the transmission. Conventional dual clutch transmission control methods lack this ability. Accordingly, there remains a need in the art a method for operatively and actively controlling the positioning of the electro-hydraulic synchronizers of a dual clutch transmission for use in motor vehicle driveline.

SUMMARY OF THE INVENTION

The disadvantages of the related art are overcome by the method of the present invention for controlling the positioning of the electro-hydraulic synchronizers of a dual clutch transmission. The dual clutch transmission is of the type that includes a dual coaxial clutch assembly, a first input shaft having a gear set, a second input shaft coaxial to the first and also having a gear set, a counter shaft having mating gears for the gears of the two input shafts, an output shaft, a reverse counter shaft, a plurality of synchronizers to selectively engage and disengage the various gears sets, and a plurality of shift actuators adapted to move the synchronizers. The method has the advantage of providing control over the synchronizers of a dual clutch transmission so that their movement is accurately and finely controlled and their positions are constantly monitored. Specifically, the method provides for the movement of the synchronizers in and out of engagement including repetitive fault control that provides for a recycling of the method steps until the desired action is achieved even if the synchronizers do not complete their commanded movement on the first attempt. The method also accurately distinguishes between a full engagement position, a pre-determined minimum engagement position, and a pre-determined jumpout condition in which loss of synchronizer engagement is eminent.

One advantage of the present invention is provided in the constant monitoring of the neutral positions of the synchronizers and controlling them while in neutral to avoid a drift condition where a neutralized but errant synchronizer could drift into non-commanded contact with a gear set causing interference and damage. Thus, the method of the present invention not only monitors a neutralized synchronizer to sense if the synchronizers drifts but also corrects its position by moving the synchronizer back to its neutral position if a drift occurs.

Another advantage of the present invention is provided in the constant monitoring of the engaged positions of the synchronizers and controlling them while engaged to avoid a jumpout event where the synchronizer could slip out of engagement causing damage and loss of control. When any synchronizer is first engaged, the method provides that the synchronizer is moved to a full engagement position then monitors the synchronizer as it operates to transfer torque in the transmission to prevent a jumpout condition. Thus, the method of the present invention not only monitors an engaged synchronizer to sense if the synchronizers slips out of full engagement toward a possible jumpout but also corrects its position by moving the synchronizer back to its full engagement position if a slip occurs.

Another advantage is that the method provides for fault monitoring of the operation of the synchronizers of the dual clutch transmission so that the failure of a synchronizer to engage or disengage will provide a gear fault to the electronic control unit overseeing transmission operation allowing for a partial degraded operation of the transmission if desired. In this way, the method of the present invention provides for accurate and consistent control over the operation of the gear sets in a dual clutch transmission during meshing engagement, during shifting, and when the gear sets are not engaged.

Other objects, features and advantages of the present invention will be readily appreciated as the same becomes better understood after reading the subsequent description taken in connection with the accompanying drawings.

DETAILED DESCRIPTION OF THE PREFERRED EMBODIMENT(S)

Figure 1:
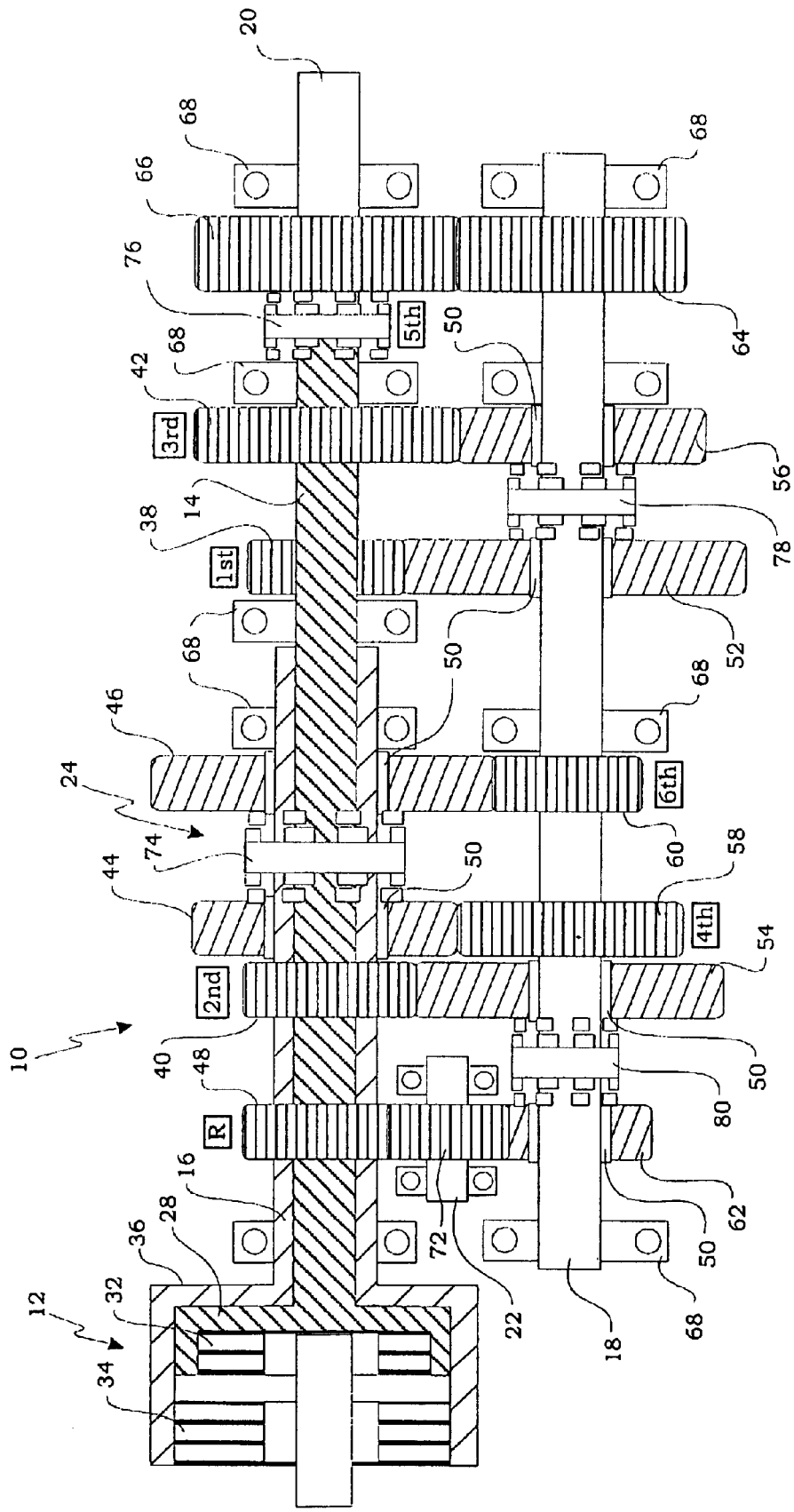
FIG. 1 is a generalized schematic illustration of a dual clutch transmission of the type that may be controlled by the method of the present invention.
Figure 2:
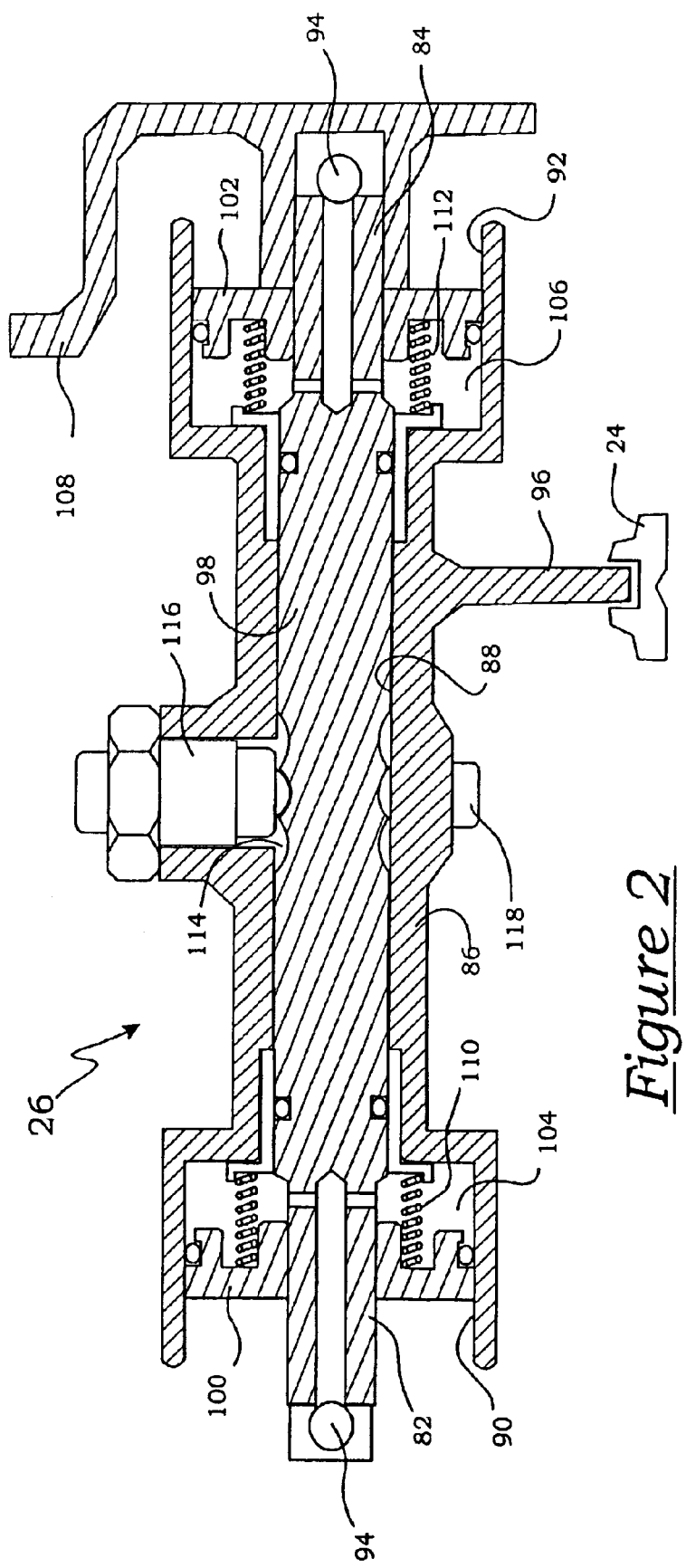
FIG. 2 is an cross-section side view of a hydraulically actuated shift actuator of a dual clutch transmission of the type that may be controlled by the method of the present.

A representative dual clutch transmission that may be controlled by the present invention is generally indicated at 10 in the schematic illustrated in FIG. 1. Specifically, as shown in FIG. 1, the dual clutch transmission 10 includes a dual, coaxial clutch assembly generally indicated at 12, a first input shaft, generally indicated at 14, a second input shaft, generally indicated at 16, that is coaxial to the first, a counter shaft, generally indicated at 18, an output shaft 20, a reverse counter shaft 22, a plurality of synchronizers, generally indicated at 24, and a plurality of shift actuators generally indicated at 26 (FIG. 2).

The dual clutch transmission 10 forms a portion of a vehicle powertrain and is responsible for taking a torque input from a prime mover, such as an internal combustion engine and transmitting the torque through selectable gear ratios to the vehicle drive wheels. The dual clutch transmission 10 operatively routes the applied torque from the engine through the dual, coaxial clutch assembly 12 to either the first input shaft 14 or the second input shaft 16. The input shafts 14 and 16 include a first series of gears, which are in constant mesh with a second series of gears disposed on the counter shaft 18. Each one of the first series of gears interacting with one of the second series of gears to provide the different gear ratios sets used for transferring torque. The counter shaft 18 also includes a first output gear that is in constant mesh with a second output gear disposed on the output shaft 20. The plurality of synchronizers 24 are disposed on the two input shafts 14, 16 and on the counter shaft 18 and are operatively controlled by the plurality of shift actuators 26 to selectively engage one of the gear ratio sets. Thus, torque is transferred from the engine to the dual, coaxial clutch assembly 12, to one of the input shafts 14 or 16, to the counter shaft 18 through one of the gear ratio sets, and to the output shaft 20. The output shaft 20 further provides the output torque to the remainder of the powertrain. Additionally, the reverse counter shaft 22 includes an intermediate gear that is disposed between one of the first series of gears and one of the second series of gears, which allows for a reverse rotation of the counter shaft 18 and the output shaft 20. Each of these components will be discussed in greater detail below.

Specifically, the dual, coaxial clutch assembly 12 includes a first clutch mechanism 32 and a second clutch mechanism 34. The first clutch mechanism 32 is, in part, physically connected to a portion of the engine flywheel (not shown) and is, in part, physically attached to the first input shaft 14, such that the first clutch mechanism 32 can operatively and selectively engage or disengage the first input shaft 14 to and from the flywheel. Similarly, the second clutch mechanism 34 is, in part, physically connected to a portion of the flywheel and is, in part, physically attached to the second input shaft 16, such that the second clutch mechanism 34 can operatively and selectively engage or disengage the second input shaft 16 to and from the flywheel. As can be seen from FIG. 1, the first and second clutch mechanisms 32, 34 are coaxial and co-centric such that the outer case 28 of the first clutch mechanism 32 fits inside of the outer case 36 of the second clutch mechanism 34. Similarly, the first and second input shafts 14, 16 are also coaxial and co-centric such that the second input shaft 16 is hollow having an inside diameter sufficient to allow the first input shaft 14 to pass through and be partially supported by the second input shaft 16. The first input shaft 14 includes a first input gear 38 and a third input gear 42. The first input shaft 14 is longer in length than the second input shaft 16 so that the first input gear 38 and a third input gear 42 are disposed on the portion of the first input shaft 14 that extends beyond the second input shaft 16. The second input shaft 16 includes a second input gear 40, a fourth input gear 44, a sixth input gear 46, and a reverse input gear 48. As shown in FIG. 1, the second input gear 40 and the reverse input gear 48 are fixedly disposed on the second input shaft 16 and the fourth input gear 44 and sixth input gear 46 are rotatably supported about the second input shaft 16 upon bearing assemblies 50 so that their rotation is unrestrained unless the accompanying synchronizer is engaged, as will be discussed in greater detail below.

In the preferred embodiment, the counter shaft 18 is a single, one-piece shaft that includes the opposing, or counter, gears to those on the inputs shafts 14, 16. As shown in FIG. 1, the counter shaft 18 includes a first counter gear 52, a second counter gear 54, a third counter gear 56, a fourth counter gear 58, a sixth counter gear 60, and a reverse counter gear 62. The counter shaft 18 fixedly retains the fourth counter gear 58 and counter gear 60, while first, second, third, and reverse counter gears 52, 54, 56, 62 are supported about the counter shaft 18 by bearing assemblies 50 so that their rotation is unrestrained unless the accompanying synchronizer is engaged as will be discussed in greater detail below. The counter shaft 18 also fixedly retains a first drive gear 64 that meshingly engages the corresponding second driven gear 66 on the output shaft 20. The second driven gear 66 is fixedly retained on the output shaft 20. The output shaft 20 extends outward from the transmission 10 to provide an attachment for the remainder of the powertrain.

In the preferred embodiment, the reverse counter shaft 22 is a relatively short shaft having a single reverse intermediate gear 72 that is disposed between, and meshingly engaged with, the reverse input gear 48 on the second input shaft 16 and the reverse counter gear 62 on the counter shaft 18. Thus, when the reverse gear 48, 62, and 72 are engaged, the reverse intermediate gear 72 on the reverse counter shaft 22 causes the counter shaft 18 to turn in the opposite rotational direction from the forward gears thereby providing a reverse rotation of the output shaft 20. It should be appreciated that all of the shafts of the dual clutch transmission 10 are disposed and rotationally secured within the transmission 10 by some manner of bearing assembly such as roller bearings, for example, shown at 68 in FIG. 1.

The engagement and disengagement of the various forward and reverse gears is accomplished by the actuation of the synchronizers 24 within the transmission. As shown in FIG. 1 in this example of a dual clutch transmission 10, there are four synchronizers 74, 76, 78, and 80 that are utilized to shift through the six forward gears and reverse. It should be appreciated that they are a variety of known types of synchronizers that are capable of engaging a gear to a shaft and that the particular type employed for the purposes of this discussion is beyond the scope of the present invention. Generally speaking, any type of synchronizer that is movable by a shift fork or like device may be employed. As shown in the representative example of FIG. 1, the synchronizers are two sided, dual actuated synchronizers, such that they engage one gear to its shaft when moved off of a center neutralized position to the right and engage another gear to its shaft when moved to the left. Specifically with reference to FIG. 1, synchronizer 78 can be actuated to the left to engage the first counter gear 52 on the counter shaft 18 or actuated to the right to engage the third counter gear 56. Synchronizer 80 can be actuated to the left to engage the reverse counter gear 62 or actuated to the right to engage the second counter gear 54. Likewise, synchronizer 74 can be actuated to the left to engage the fourth input gear 44 or actuated to the right to engage the sixth input gear 46. Synchronizer 76 is actuated to the right to directly engage the end of the first input shaft 14 to the output shaft 20 thereby providing a direct 1:1 (one to one) drive ratio for fifth gear. There is no gear set to engage to the left of synchronizer 76.

To actuate the synchronizers 74, 76, 78, and 80, this representative example of a dual clutch transmission 10 utilizes hydraulically driven shift actuators 26 with attached shift forks to selectively move the synchronizers so that they engage or disengage (neutralize) the desired gears. As shown in FIG. 2, the shift actuators 26 are essentially two way or dual hydraulic valve assemblies that are driven back and forth linearly, in parallel to one of the input shafts 14, 16 or the counter shaft 18, to move a shift fork 96, and ultimately one of the plurality of synchronizers 24 in and out of engagement. It should be appreciated from the description that follows that other types of actuators that are capable of driving a shift fork back and forth to move a synchronizer, may also be employed with the method of the present invention. These include mechanical actuators, hydro-mechanical actuators, electro-mechanical actuators, electrical actuators, and the like.

Referring to FIG. 2, the hydraulically operated shift actuators 26 include an outer case 86 that includes a main bore 88 having two cylindrically shaped open ends 90, 92. A shift fork 96 is formed as part of the outer case 86 and extends radially outwards to engage a synchronizer that is disposed on one of the transmission shafts. A main shaft 98 is slidably disposed within the main bore 88 of the outer case 86. The main shaft 98 includes two opposing ends 82 and 84 upon which two piston 100, 102 are fixedly disposed, respectively. The pistons 100, 102 are moveable with respect to the cylindrically shaped open ends 90, 92 of the outer case 86. The interaction of each piston 100, 102 within its respective cylinder end 90, 92 forms an expansion chamber 104, 106. One of the ends 84 of the main shaft 98 is fixed to the body of the transmission 108. In this manner, the outer case 86 and shift fork 96 move relative to the fixed main shaft 98 so that the shift fork 96 will cause the synchronizer 24 to be moved. To affect movement of the outer case 86, the shifter fork 96, and thus the synchronizer 24, hydraulic fluid is selectively delivered under pressure to either one of the expansion chambers 104, 106 through the fluid passages 94.

When hydraulic pressure is applied to expansion chamber 104, the pressure acts against piston 100 and the cylinder shaped end 90 of the outer case 86 causing the outer case 86 and the shifter fork 96 to move to the right, as illustrated. When hydraulic pressure is applied to expansion chamber 106, the pressure acts against piston 102 and the cylinder shaped end 92 of the outer case 86 causing the outer case 86 and the shifter fork 96 to move to the left. The expansion chambers 104, 106 also contain biasing members 110, 112 such as springs, which assist in returning the outer case 86 to its center, thereby urging the outer case 86 and the shifter fork 96 to its neutral position. It should be appreciated that when disengaging a synchronizer 24 from an engaged position, the hydraulic pressure that was applied to actuate the shift actuator 26 to the current engagement position is removed and the opposing expansion chamber may be charged with enough pressure and for sufficient time to move the shift actuator 26 back to a neutralized position rather than relying solely on the biasing force of the biasing member. The main shaft 98 also includes a set of circumferential grooves 114, which work cooperatively with a spring loaded ball assembly, generally indicated at 116, disposed upon the outer case 86 to provide detent positioning and serve as positive locating points for the movement of the shift actuator 26. The outer case 86 also includes an externally mounted position sensor 118 that is used to monitor the position of the outer case 86 relative to the fixed main shaft 98 so that the actual position of the synchronizer 24 is always known.

Figure 3:
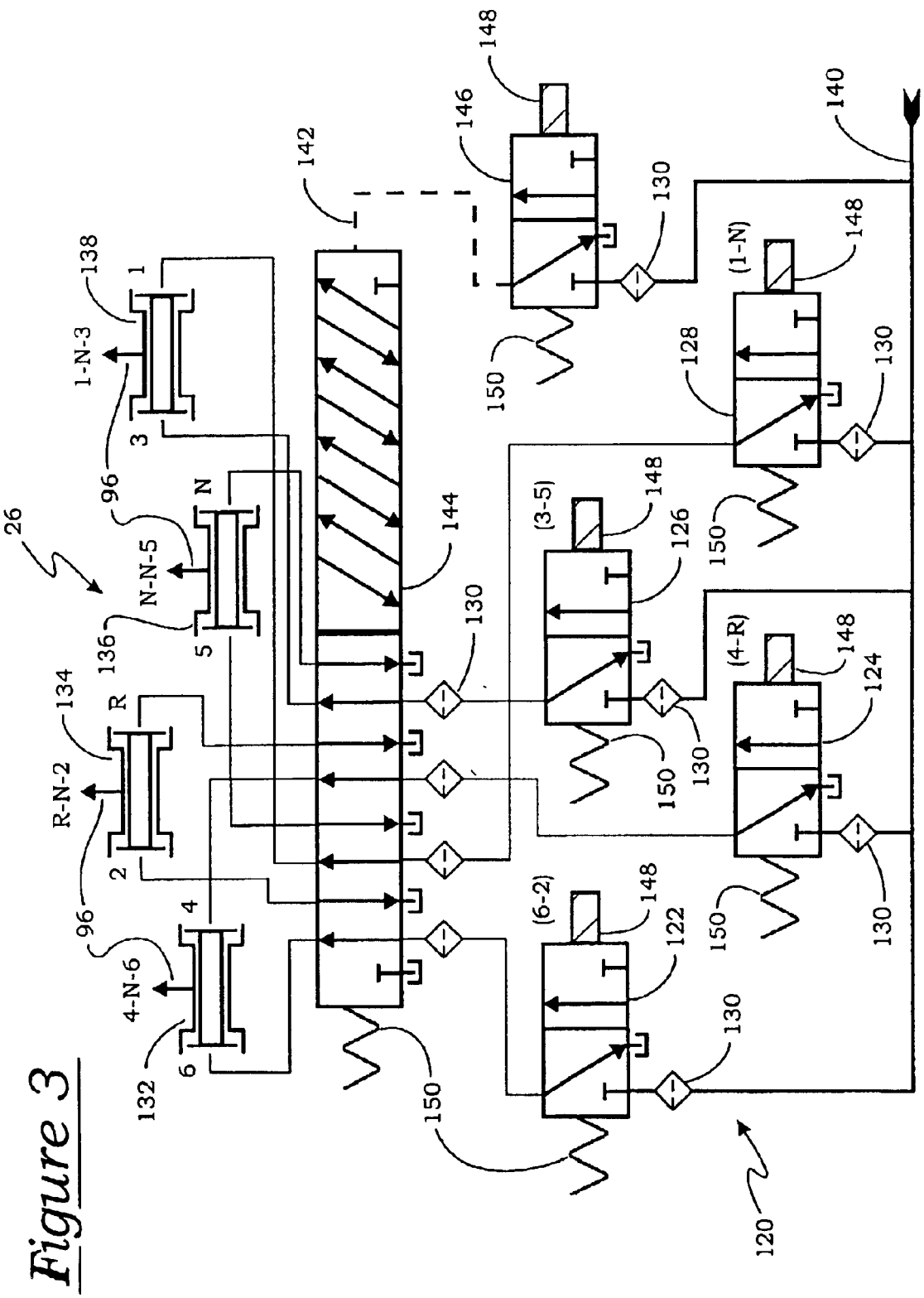
FIG. 3 is a schematic illustration of the electro-hydraulic control circuit for the shift actuators of a dual clutch transmission of the type that may be controlled by the method of the present invention.

The application of hydraulic pressure to the shift actuators 26 is operatively controlled by actuator solenoids, generally indicated at 120 in FIG. 3. The actuator solenoids 120 are electrically controlled by an electronic control unit (ECU), not shown but commonly known in the art. The steps of the method of the present invention direct the ECU to open and close the lines of pressurized hydraulic fluid that enter the expansion chambers 104 or 106 of the shift actuators 26. It should be appreciated that the method of the present invention, as schematically illustrated herein, is a control scheme, stored or otherwise located, within a greater control device such as an electronic control unit (ECU) overseeing the functioning of the transmission 10 or an electronic control unit for the vehicle in which the dual clutch transmission 10 may be installed. Regardless, there exists a control device that is used to control the transmission and that is generally beyond the scope of this invention but that is operable to provide the proper voltages, signals, and/or hydraulic pressures to operate the transmission 10 and particularly the actuator solenoids 120 of the dual clutch transmission 10. Thus, the control method of the present invention is described below in connection with the flowcharts and may be a standalone process or merely a portion, such as a sub-routine, or series of sub-routines, of a larger control scheme within the ECU. In this manner, the movement of the shift actuators 26, the shift forks 96, and the synchronizers 24 of the dual clutch transmission 10 is controlled by the method of the present invention.

The actuator solenoids 120 and shift actuators 26 are schematically represented in FIG. 3. In this figure, all the actuator solenoids 120 are illustrated in the de-energized position. It should be appreciated that, as previously mentioned, the shift actuation of the dual clutch transmission 10 may be fully electrical rather than electro-hydraulic, and in that case, the actuator solenoids would be replaced by some type of physical drive devices to move the shift forks and the synchronizers. For clarity, the synchronizers 24 are not illustrated in FIG. 3 and the shift forks 96 are depicted as arrows extending from the shift actuators 26. As previously mentioned, each of the shift actuators 26 are dual hydraulic assemblies operatively moving a two sided synchronizer 24 to engage their respective gear sets. As shown in FIG. 3 with respect to this example of a dual clutch transmission 10, there is one actuator solenoid 122, 124, 126, and 128 for each of the shift actuators 132, 134, 136, and 138, respectively. Thus, each actuator solenoid 120 must provide pressure to both expansion chambers 104, 106 (left and right) for each shift actuator 26 to cause it to engage the synchronizers 24 in both directions. To this end, the actuator solenoids 120 are multiplexed (i.e., used for more than one operation) through the use of a multiplex valve 144. The multiplex valve 144 is controlled by a multiplex solenoid 146, which applies hydraulic pressure through line 142 to activate the multiplex valve 144 to the left, as illustrated. Through the multiplex valve 144, each actuator solenoid 120 provides the hydraulic pressure for two shift movements. The actuator solenoids 120 and the multiplex solenoid 146 are electrically controlled by the ECU through the application and interruption of a voltage to the coil assemblies 148 of the individual solenoids. The solenoids 120 and 146 have biasing members 150 that return the valve member to its normally closed position when de-energized, as shown in FIG. 3. It should be appreciated that the multiplex valve 144 and the multiplex solenoid 146 may also be a combined unit that would be electrically activated rather that an electro-hydraulic arrangement. It should be further appreciated that this particular multiplexing approach is only one of many possible actuating arrangements that may be constructed within a dual clutch transmission. It should be still further appreciated that while the method steps of the present invention direct the ECU to actuate the shift actuators 26 to control the synchronizers of a dual clutch transmission, the actual application of voltage to energize the actuator solenoids 120 is under a higher level control scheme within the ECU and is beyond the scope of this invention.

With continuing reference to FIG. 3 and to illustrate the operation of the actuator solenoids 120, when first gear is selected, actuator solenoid 128 is energized and the hydraulic fluid path to the right side of shift actuator 138 is pressurized causing shift actuator 138 to move to the left so that the shifter fork 96 moves synchronizer 78 into first gear engagement. It should be appreciated that line 140 in FIG. 3 is representative of a pressurized hydraulic supply line that provides hydraulic fluid to the actuators 26 through filters 130. When engaging second gear there is no direct path through the multiplex valve 144 and the multiplex solenoid 146 must be energized first so that the multiplex valve 144 opens a pathway for actuator solenoid 122 to pressurize the left side of shift actuator 134 which moves shift actuator 134 to the right so that the shifter fork 96 moves the synchronizer into second gear engagement. It should be further appreciated that the disengagement of the synchronizers 24 and thus the neutralization of an engaged gear set is accomplished by actuating the opposing side of the respective shift actuator 26. This opposing, neutralizing actuation of the shift actuator 26 is only to the point of moving the shift fork 96 and respective synchronizer to the neutral and disengaged position without continuing the actuation to a full engagement of the opposing gear set. Thus, to disengage first gear, actuator solenoid 126 is energized and the hydraulic fluid path to the left side of shift actuator 138 is pressurized causing shift actuator 138 to move to the right so that the shifter fork 96 moves synchronizer 78 out of first gear engagement to the neutral position.

Therefore, through the use of the multiplex valve 144, actuator solenoid 122 controls the shifts into either sixth or second gears, as well as the neutralization of fourth or reverse. Actuator solenoid 124 controls the shifts into either fourth or reverse gear, as well as the neutralization of second or sixth. Actuator solenoid 126 controls the shifts into either third or fifth gears, as well as the neutralization of first. Actuator solenoid 128 controls the shifts into first gear, as well as the neutralization of third or fifth. In this representative example, there are four solenoids and a multiplex valve allowing eight possible actuation combinations for this six-speed transmission with reverse. Only seven of the eight combinations are used, thus actuator solenoid 126 only has to neutralize one gear set. It should be appreciated that the actuator action that moves a synchronizer into engagement is generally known as an "APPLY" action and the actuator action to move a synchronizer out of engagement to a neutral position is generally know as a "RELEASE" action. Thus, in operation, each of the actuator solenoids 120 are used to charge one particular side of a shift actuator 26 for either an APPLY action or a RELEASE action depending upon the desired result.

The method of the present invention will be described with reference to the flow chart generally indicated at 160, 164, 166, and 169 in FIGS. 4–7, respectively. The method selectively controls the positioning of the shift actuators 26 of the each of the synchronizers 24 of the dual clutch transmission 10 so that the accurate engagement and positioning of each synchronizer 24 is achieved in the desired manner. For example, in operating the vehicle, a gear selection lever, or the like, may be placed in the "D" position by the operator to initiate forward motion. Through another program or sub-routine within the ECU, which is beyond the scope of this invention, the proper gear ratio within the dual clutch transmission for the current vehicle operating conditions is selected. In this example, from a vehicle standing start, a low gear, such as first gear, will likely be automatically selected. The ECU then makes a decision as to which, if any, actuators need to be engaged and which, if any, actuators need to be disengaged to accomplish the desired actions in the powertrain. These actions may include a commanded engagement of one or two gear ratio sets and a concurrently commanded disengagement and/or neutralization of one or two gear sets. It should be appreciated that the present invention is concerned with the positioning and monitoring of synchronizers of the dual clutch transmission only after higher level commands beyond the scope of this invention have been executed so as to determine which synchronizer are to be actuated and in what order for shifting purposes.

Figure 4:
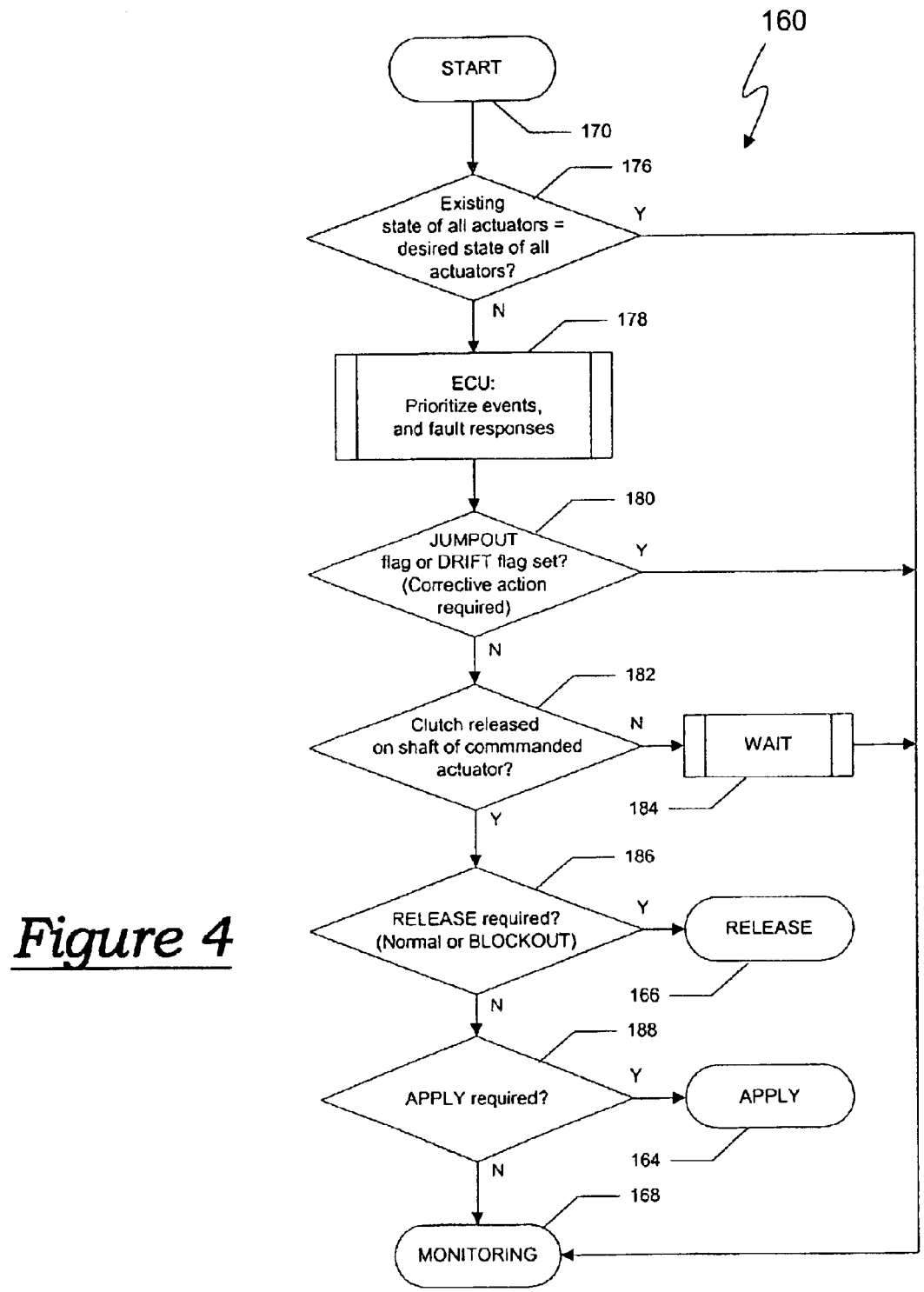
FIG. 4 is a block diagram flowchart of the method of the present invention for controlling a dual clutch transmission.

The control routine, and thereby the method steps, of the present invention are initiated at the "START" entry block 170 of FIG. 4. The succeeding method steps will then determine which synchronization actions are to be taken in response to various conditions. It should be appreciated that the control routine is cyclical and may be performing a repetitive run through the method steps to monitor the synchronizer positions or it may be performing the method steps in a specific response to an ECU command to move a synchronizer. Thus, the flow path of the method steps moves to process block 176 to compare the existing commanded state of each of the actuators 26 to their desired state. If each of the actuators 26 is found to be in an existing commanded state that is the same as the desired state, then no action is required and the "YES" path is followed through to the "MONITORING" sub-routine 168 (FIG. 7), which will be discussed in greater detail below. If the desired state of any actuator 26 is different than its currently existing commanded state, the "NO" path is followed to process block 178.

Process block 178 allows the ECU to prioritize any pending synchronizer and clutch interaction given that more than one synchronizer may be required to engage or disengage. The commanded state of actuators 26 is updated so that they may be actuated in a pre-determined order. Process block 178 also allows the ECU to coordinate any fault action or fault prevention action that may be occurring or pending. Then flow path then moves to decision block 180, which determines if any corrective action is required. Corrective actions take precedence over normal commanded actuator movement and are specifically warranted when either the "JUMPOUT" or "DRIFT" warning flags are set. These indicators will be discussed in greater detail below, but if either flag is set the "YES" path to be taken to direct the flow to the MONITORING sub-routine 168. It should be appreciated that, as a cyclical monitoring function of the method steps of the present invention, the steps often loop back upon themselves and some decision blocks, as will be discussed, are influenced by flags or faults set in previous passes through the flow path of the method steps. If no flags are set, the "NO" path is taken to decision block 182.

Decision block 182 refers back to process step 178, at which time it may have been determined that one of the actuators 26 that is to be released controls a gear set that is currently transferring torque. This requires that the associated clutch must first be released before the actuator can be released. Decision block 182 determines if the clutch related to the commanded actuator has been released. If the subject clutch has not yet been released, the "NO" route is followed to process block 184, where the clutch release is commanded by the ECU and a wait is necessary to allow for the clutch disengagement to take place. It should be appreciated that the release of the clutch and the appropriate waiting period occurs outside the control of the present invention and may be determined by any variety of methods such as a specific time period appropriate for the present conditions, or by pressure sensors to indicate a change in the torque transferred across the clutches 32, 34. After the expiration of the wait at 184, the flow path moves the MONITORING sub-routine 168, which will ultimately recycle the method steps back to decision block 182.

Figure 6:
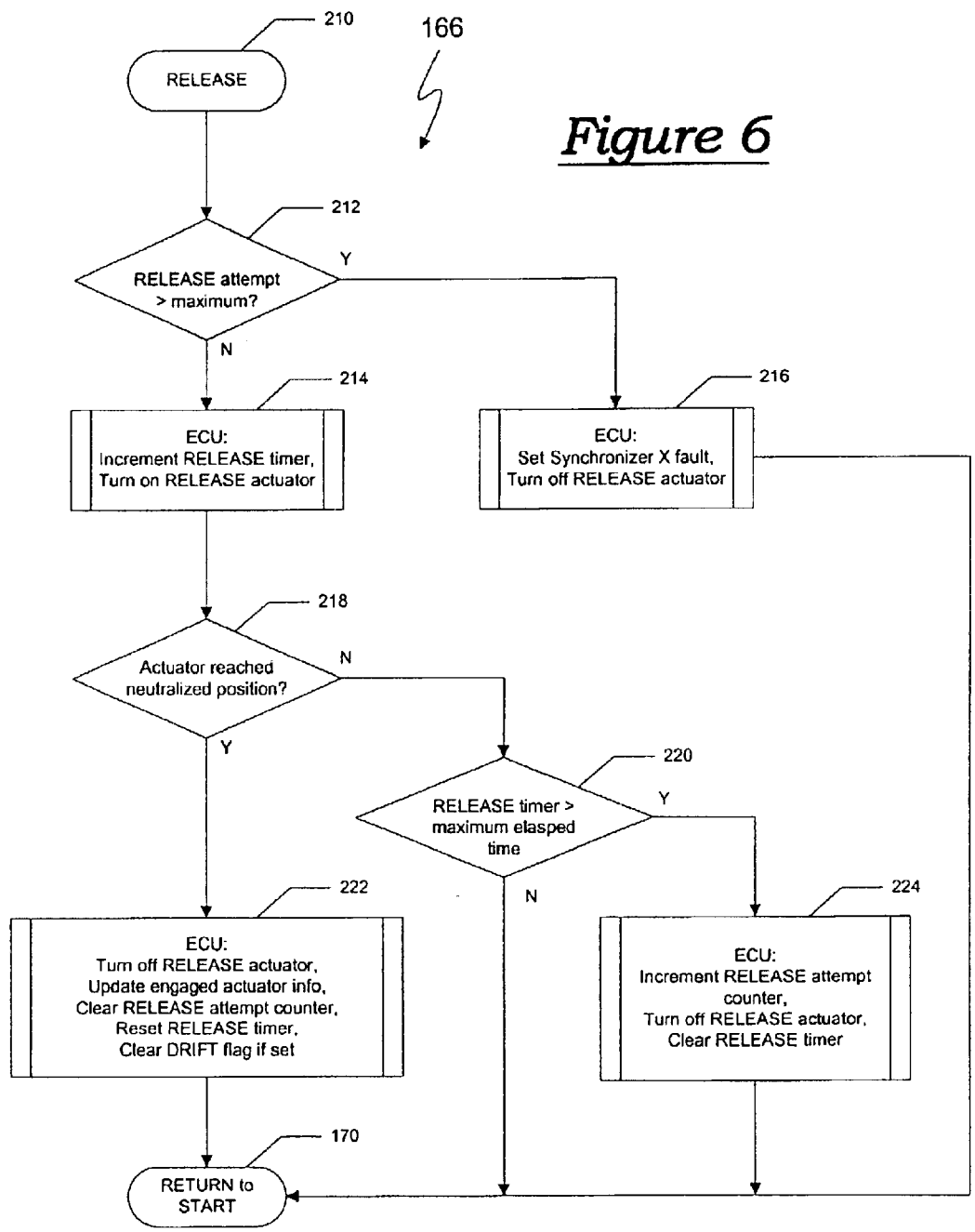
FIG. 6 is a block diagram flowchart of a RELEASE sub-routine of the present invention for controlling the disengagement and neutralization of the shift actuators of a dual clutch transmission.

If the appropriate clutch was released prior to the flow path reaching decision block 182 or when the flow path recycles to decision block 182 after the wait at block 184, the flow path continues to decision block 186, in which the ECU determines if a RELEASE action is required. The RELEASE sub-routine, generally indicated at 166, and discussed in greater detail in connection with FIG. 6 below, activates the particular actuator solenoid 120 that moves the shift actuator 26 and a synchronizer 24 out of engagement to a neutral position. The RELEASE sub-routine 166 may also be used to neutralize or center a shift actuator 26 that is drifting out of the neutral position or one that was unable to complete a commanded engagement. Failure of a synchronizer 24 to complete a commanded engagement within a pre-determined and specified time period is known in the art as an "APPLY BLOCKOUT", or simply a "BLOCKOUT" condition and may occur due to various mechanical reasons. If a BLOCKOUT has occurred, the shift actuator 26 must be returned to the neutral position such that another attempt at applying, or engaging, the synchronizer 24 can subsequently be made. This specific action in response to a BLOCKOUT condition is known as a BLOCKOUT RELEASE. Thus, if, at decision block 186, either and normal RELEASE or a BLOCKOUT RELEASE is required, the flow path follows the "YES" route to initiate the RELEASE sub-routine 166 (FIG. 6). If neither conditions are true, then the "NO" path is followed to decision block 188 where the ECU the makes the determination if the APPLY sub-routine is required.

Figure 5:
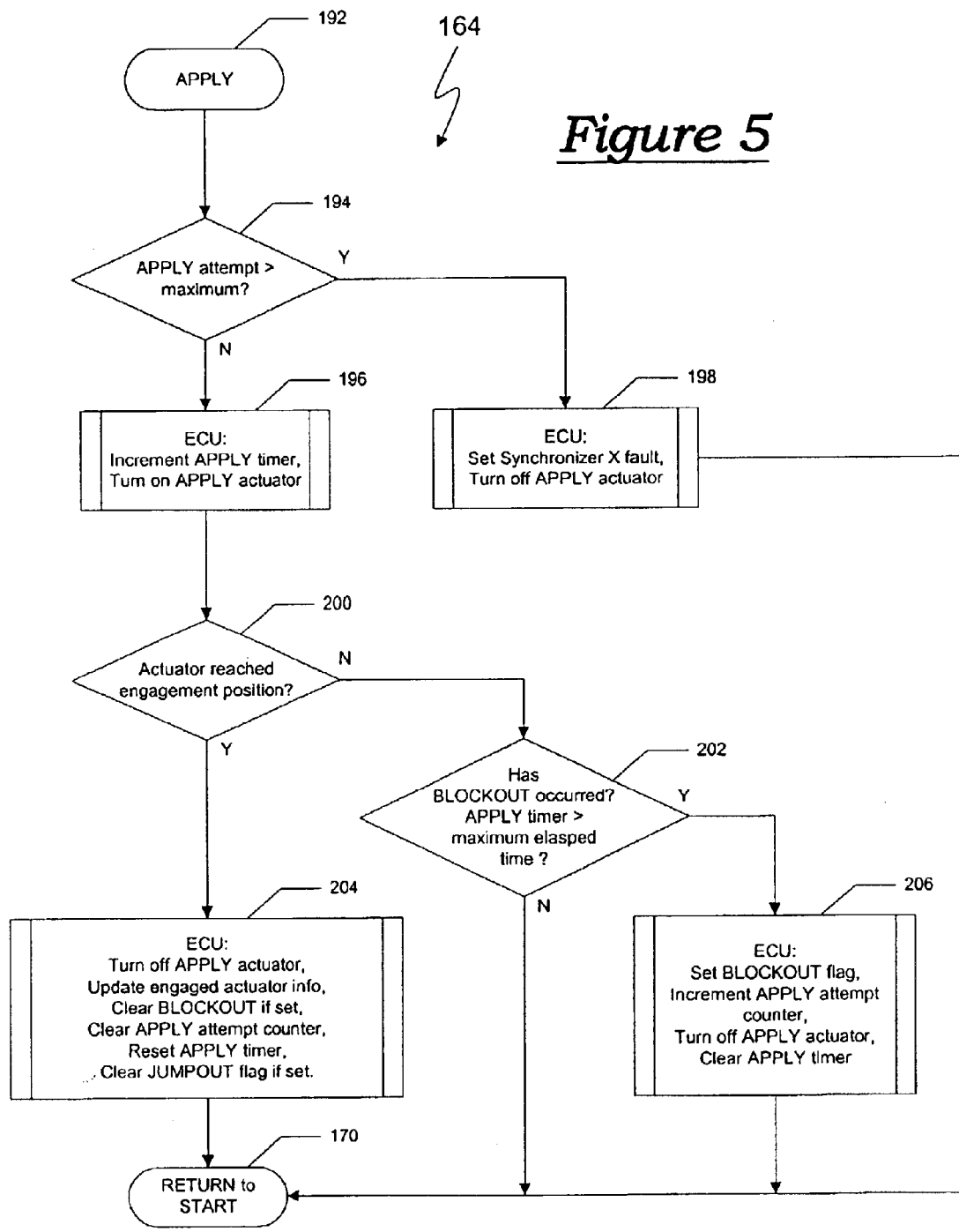
FIG. 5 is a block diagram flowchart of an APPLY sub-routine of the present invention for controlling the engagement of the shift actuators of a dual clutch transmission.

To this end, the method of the present invention includes an APPLY sub-routine, generally indicated at 164 and described in greater detail with respect to FIG. 5 below. Initiating the APPLY subroutine 164 results in the application of the proper electrical signal to the particular actuator solenoid 120 to cause a specific shift actuator 26 to move the required synchronizer 24 in the necessary direction to engage the desired gear. Specifically, the APPLY sub-routine 164 will cause the desired actuator solenoid 120 to be turned on until the actuator position, as determined by the position sensor 118 on the shift actuator main body 86, reaches a position of full engagement. The shift actuator 26, and thus the synchronizer 24, is moved by the APPLY sub-routine 164 to a full engagement position. The full engagement position, as sensed by the ECU, allows for small variants in placement so that an average position for full engagement is pre-determined and falls within an acceptable range. However, there is also a pre-determined "minimum engaged position" of the actuator, which directly relates to a pre-determined minimal physical engagement between the synchronizer and the particular gear to be engaged. The minimal physical engagement position allows torque to be transferred safely to the output of the transmission without damaging the components or risking a synchronizer jumpout.

Referring back to decision block 188 in FIG. 4, if the APPLY sub-routine 164 is not needed, then the flow path follows the "NO" branch back to the MONITORING sub-routine 168. If a shift actuator 26 needs to be actuated so that a synchronizer 24 can be engaged, then the "YES" path is followed to initiate the APPLY sub-routine 164, as shown in FIG. 5. The APPLY sub-routine 164 begins at entry block 192 and moves to decision block 194 in which the ECU checks to see if the APPLY attempt register has reached a pre-determined maximum. This is a pre-determined number of attempts to activate an actuator 26 so that the synchronizer 24 is moved to full engagement. If the APPLY attempt register has not reached the pre-determined maximum at decision block 194, then the "NO" path is followed to process block 196. Process block 196 commands the ECU to turn on the particular solenoid that applies the hydraulic force to the shift actuator 26 that will move the synchronizer 24. Process block 196 also starts and updates an APPLY timer (initially zeroed out) within the ECU so that the APPLY attempt is monitored within a time frame. It should be appreciated that the control of the shift actuator 26 may be performed by any of several known methods, such as a pre-determined or variable current flow or duty cycle, or the like. After the actions of process block 196 are performed, the flow path moves to decision block 200, in which the ECU checks to see if the shift actuator has reached its full engagement position. If the actuator has engaged properly, the "YES" branch is taken to process block 204, which performs the necessary actions to close out the shift action within the ECU. Specifically, process block 204: 1) turns off the APPLY solenoid; 2) updates the currently engaged actuator information; 3) clears the BLOCKOUT flag if set; 4) clears the APPLY attempt counter; 5) resets the APPLY timer; and 6) clears the JUMPOUT flag (from MONITORING sub-routine 168) if set. Once the APPLY sub-routine is completed, the flow path will return to the START entry block 170 in FIG. 4.

If in decision block 200, the actuator has not yet reached the full engagement position the "NO" path is followed to decision block 202 in which the ECU determines whether a BLOCKOUT has occurred by either comparing the elapsed time in the APPLY timer to a pre-determined maximum time. If a BLOCKOUT is deemed not to have occurred then the "NO" path is taken, which returns the flow path to the back to the START entry block 170 in FIG. 4. Given that the commanded shift is still required, that no error flags have been set, and that the APPLY solenoid is still attempting to engage the commanded actuator, the flow path will move through the flow diagram of FIG. 4 until it comes again to decision block 188. Here, the "APPLY needed?" query will again route the process to the "YES" path and back to the APPLY sub-routine 164 in FIG. 5. This "APPLY loop" will continue until either the shift actuator 26 has reached the engaged position and satisfies the "YES" at decision block 200, or until a BLOCKOUT is deemed to have occurred. If a BLOCKOUT is deemed to have occurred at decision block 202, the flow path takes the "YES" route to process block 206. Process block 206 sets the BLOCKOUT flag, increments the APPLY attempt counter, clears the APPLY timer, turns off the APPLY solenoid, and then returns the flow path back to the START entry block 170 in FIG. 4.

Given that the commanded shift is still required, the flow path will move through the flow diagram of FIG. 4 until it comes again to decision block 186. Here, with a BLOCKOUT flag set, decision block 186 will route the flow path out the "YES" branch to the RELEASE sub-routine 166 described in greater detail with reference to FIG. 6. The RELEASE sub-routine 166 will be discussed in greater detail below, but, simply stated, the RELEASE sub-routine 166 will charge the side of the shift actuator 26 that is opposite of the APPLY commanded side of the shift actuator 26 so that the shift actuator 26 will be moved back toward the neutral position. If this is accomplished without incident, the BLOCKOUT is cleared and the flow path returned to the START entry block 170 again. Since the BLOCKOUT is cleared, and the commanded shift is still required, the flow path will move through the flow diagram of FIG. 4 until it comes again to decision block 188. Once again, the "APPLY needed?" query will route the process to the "YES" path and back to the APPLY sub-routine 164 in FIG. 5. The APPLY sub-routine 164 continues and, as discussed above, the APPLY attempt is repeated. If the APPLY attempt again fails to reach the full engagement position due to another BLOCKOUT being registered at decision block 202, process block 206 will increment the APPLY attempt counter, such that, repeated APPLY attempt failures may eventually exceed the predetermined maximum at decision block 194, as discussed above. If this occurs, the "YES" route out of decision block 194 is taken to process block 198, which sets the fault for that synchronizer (synchronizer X fault). Given that a synchronizer could not be engaged, another program or sub-routine within the ECU, which is beyond the scope of this invention, may select a gear ratio other than the ratio associated with the faulty synchronizer such that the transmission may continue operating in a diminished capacity.

As noted above, the method of the present invention includes a RELEASE sub-routine 166, which is schematically illustrated in FIG. 6 and shows the steps necessary for disengaging and/or neutralizing each of the synchronizers 24 of the dual clutch transmission 10. The RELEASE sub-routine 166 is also used to center or neutralize the shift actuators 26 if they drift out of their non-engaged neutral positions. The RELEASE sub-routine 166 is substantially similar to the APPLY subroutine 164 except that blockouts of the synchronizer 24 do not occur in the RELEASE action. Given that pre-determined pressures on the shift actuators 26 will provide adequate force to release the synchronizer 24, only one attempt would normally be made to release the synchronizer 24 from an engaged position. Furthermore, if a shift actuator 26 drifts from a commanded neutral position toward an engaged position, such that the position of the shift actuator 26 moves outside the pre-determined boundaries defined for the neutral position, the RELEASE sub-routine 166 is initiated to cause the shift actuator 26 to move back into the neutral position.

The RELEASE sub-routine 166 begins at entry block 210. The flow path moves first to decision block 212 in which the ECU checks to see if the RELEASE attempt register has reached a pre-determined maximum. This is a pre-determined number of attempts to return a shift actuator 26 to a neutralized position. If the RELEASE attempt register has not reached the pre-determined maximum at decision block 212, then the "NO" path is followed to process block 214. Process block 214 commands the ECU to turn on the solenoid, or solenoids, that apply the hydraulic force to the particular shift actuator 26 that will disengage the desired synchronizer 24, or synchronizers. It should be appreciated that the ECU may require the disengagement and/or neutralization of more than one synchronizer 24 depending on the current gear engagement and the desired result. Process block 214 also starts and updates a RELEASE timer (initially zeroed out) within the ECU so that the RELEASE attempt is monitored within in a time frame. After these actions are performed, the path moves to decision block 218, in which the ECU checks to see if the shift actuator 26 has reached the pre-determined "neutral position". If the shift actuator 26 has reached this position, the "YES" branch is taken to process block 222. Process block 222 performs the necessary actions to close out the shift action within the ECU. Specifically, process block 222: 1) turns off the RELEASE actuator; 2) updates the currently engaged actuator information; 3) clears the RELEASE attempt counter; 4) clears the RELEASE timer; and 5) clears the DRIFT flag (from MONITORING sub-routine 168) if set. Once the RELEASE subroutine 166 is completed, the flow path will return to the START entry block 170 in FIG. 4.

If in decision block 218, the shift actuator 26 has not yet reached the minimum engagement position, the "NO" path is followed to decision block 220, in which the ECU compares the elapsed time in the RELEASE timer to a pre-determined maximum time. If the elapsed time in the RELEASE timer has not exceeded the maximum time, then the "NO" path is taken, which returns the flow path to the back to the START entry block 170 in FIG. 4. Given that the commanded disengagement or neutralization is still required, that no error flags have been set, and that the RELEASE actuator is still attempting to disengage or neutralize the desired synchronizer, the flow path will move through the flow diagram of FIG. 4 until it comes again to decision block 186. The continuing requirement to disengage or neutralize (RELEASE) will again route the process to the "YES" path and back to the RELEASE sub-routine 166 in FIG. 5. This "RELEASE loop" will continue until either the shift actuator 26 has reached the neutral position and satisfies the "YES" at decision block 218, or until the RELEASE timer has exceeded the predetermined maximum allowed time for the RELEASE process in decision block 220. When the predetermined maximum allowed time has been exceeded, the flow path takes the "YES" path from decision block 220 to process block 224. Process block 224 increments the RELEASE attempt counter, clears the RELEASE timer, turns off the RELEASE actuator, and then routes the flow path back to the START entry block 170 in FIG. 4.

Given that the command to disengage or neutralize is still required, the flow path will move through the flow diagram of FIG. 4 until it comes again to decision block 186. Here, decision block 186 will again route the flow path out the "YES" branch to repeat the RELEASE sub-routine 166. If the RELEASE attempt again fails to reach the neutral position before timing out at decision block 220, process block 224 will increment the RELEASE attempt counter, such that repeated RELEASE attempt failures may eventually exceed the predetermined maximum at decision block 212, as discussed above. If this occurs, the "YES" route is taken to process block 216, sets the fault for that synchronizer (synchronizer X fault). When the synchronizer X fault is set, indicating that a particular synchronizer could not be released, then another program or sub-routine within the ECU, which is beyond the scope of this invention, may select a gear ratio other than the ratios on the same axis as the faulty synchronizer such that the transmission 10 may continue operating in a diminished capacity. The flow process will then once again return to the START entry block 170 on FIG. 4 and proceed to process any further synchronizer actions.

Figure 7:
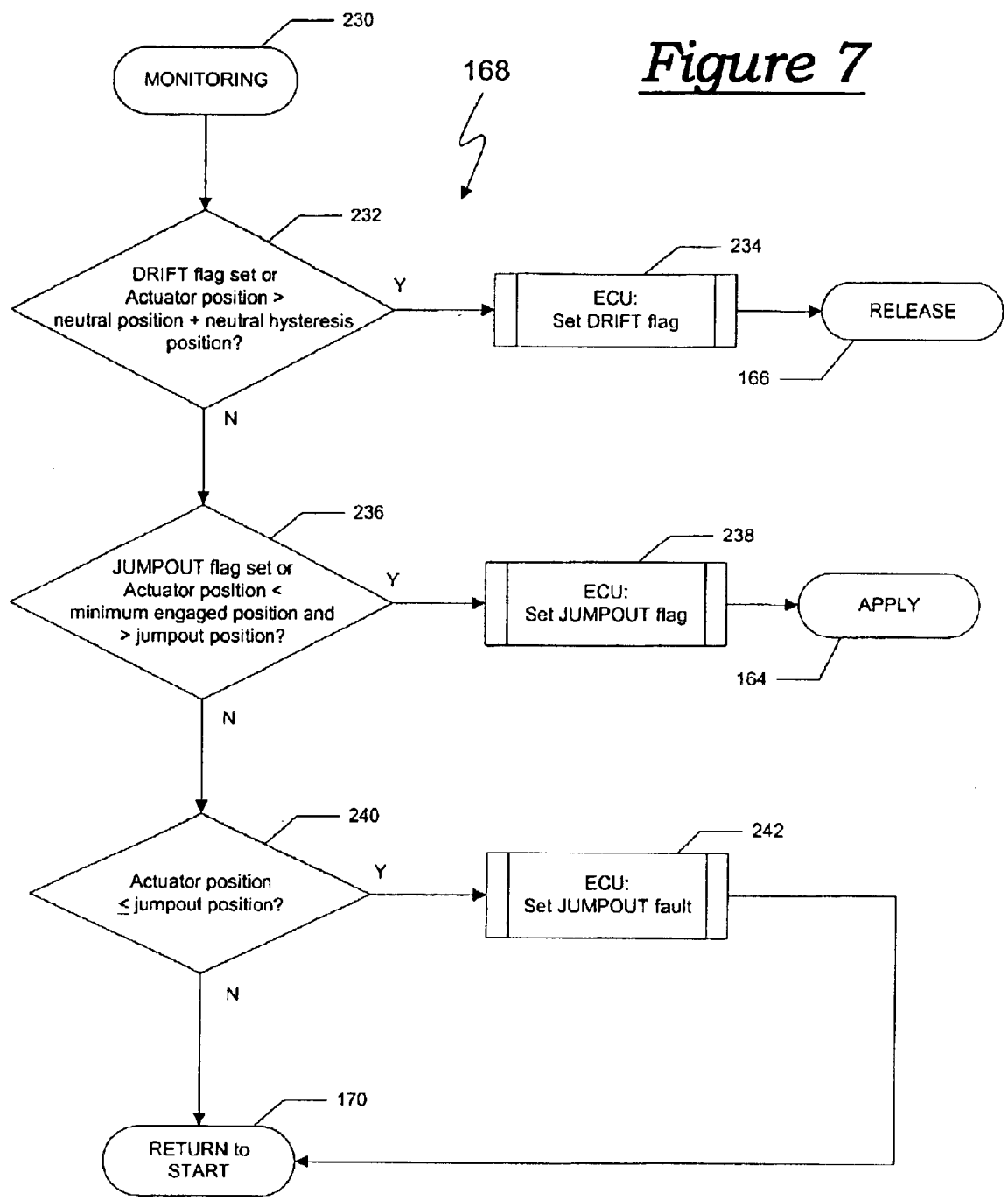
FIG. 7 is a block diagram flowchart of a MONITORING sub-routine of the present invention for preventing a synchronizer jumpout from an engaged position or prevent a synchronizer drift from a desired neutralized position in a dual clutch transmission.

As noted above, the method of the present invention also includes a MONITORING sub-routine 168, which is schematically illustrated in FIG. 7. The MONITORING sub-routine 168 includes the steps of the method of the present invention to monitor the positioning of the synchronizers 24 and their shift actuators 26 to ensure the proper and continued engagement or disengagement of the synchronizers 24 during the operation of the dual clutch transmission 10. As mentioned previously, the MONITORING sub-routine 168 monitors all of the shift actuators 26 for a possible JUMPOUT condition from an engaged position or for a possible DRIFT away from a desired neutral position. In case of a JUMPOUT condition, there is a known synchronizer position at which a synchronizer 24 will "jumpout" of engagement to a disengaged position. Under torque loading, a jumpout is very undesirable as damage to parts of the transmission and driveline can potentially occur as well as loss of vehicle driving torque. When a shift actuator 26 has engaged a synchronizer 24 and its position moves out from the previously discussed minimum engagement position toward disengagement, a JUMPOUT flag will be set and the ECU will attempt to move the shift actuator 26 back toward full engagement.

When neutralized, ideally the shift actuator 26 should maintain a specific neutral position at a midpoint directly between its engagement to the gear set to the left and its engagement to the gear set to the right. However, the structure of the shift actuators 26 and synchronizers 24 within the dual clutch transmission 10 allow for a sight variance in either shift direction. This allowable variance is referred to as the neutral hysteresis position. There is a neutral hysteresis position in either shift direction. During operation of the dual clutch transmission 10, it is very undesirable to allow a non-engaged shift actuator, and thus the synchronizer, to drift beyond its neutral hysteresis position into uncommanded contact with one of its gear sets as potentially unfavorable drag and possibly damage to parts of the transmission and driveline can occur. The MONITORING sub-routine 168 will monitor the position of the synchronizer to avoid this condition. When a shift actuator 26 is neutralized and its position moves from the previously discussed neutral position to beyond the neutral hysteresis position, a The MONITORING sub-routine 168 begins at entry block 230 and moves first to decision block 232 in which the ECU checks to see if the DRIFT flag is currently set, or if any shift actuator 26 commanded to the neutral position has drifted too far away from the neutral position. Decision block 232 determines a DRIFT condition by comparing the current actuator position to a pre-determined limit of the neutral position plus the neutral hysteresis position. Thus, DRIFT (in either direction) has occurred when decision block 232 determines that the position of a neutralizer shift actuator 26 is greater than the neutral position and the neutral hysteresis position. If this occurs, the "YES" route is followed to process block 234 in which the DRIFT flag is set. The flow path then continues to the RELEASE sub-routine 166.

If no shift actuators 26 have drifted beyond the neutral hysteresis position, then the "NO" path of decision block 232 is followed to decision block 236. At decision block 236, the ECU checks if the JUMPOUT flag is currently set, or if any engaged actuator 26 has moved to a position requiring protection against possible jumpout. Decision block 236 determines if a JUMPOUT condition exists by comparing the positions of all engaged actuators to both a pre-determined minimum engaged position and a pre-determined jumpout position. If the position of any engaged shift actuator 26 falls between the minimum engaged position and the JUMPOUT position, then a JUMPOUT condition exists. If this occurs, the "YES" route is followed to process block 238 in which the JUMPOUT flag is set. The flow path then continues to the APPLY sub-routine 164 (FIG. 5) to move the particular shift actuator 26 back into full engagement. If, upon reaching decision block 236, the JUMPOUT flag is not set and none of the engaged actuators 26 are found to be between the minimum engaged position and the JUMPOUT position, then the "NO" path is followed and monitoring will continue at decision block 240 where the ECU further checks the engaged shift actuators 26 to see if any have moved out equal to, or beyond, the JUMPOUT position. This check is important when conditions are such that a shift actuator 26 may have made an uncommanded move quickly out from the full engagement position to the critical JUMPOUT position but has not yet physically jumped out of engagement. It should be appreciated that this could occur is some rapid manner, so that a shift actuator 26 may reach this position so quickly that the step at decision block 234 does not sense the shift actuator 26 working its way out.

If a shift actuator 26 has reached or is beyond the JUMPOUT position, the "YES" branch of decision block 240 is followed to process block 242 where a JUMPOUT fault will be set in the ECU signifying that the particular shift actuator is unable to maintain the proper actuated position. As with the other above-mentioned faults, the resultant effects and actions taken by the ECU in response to a JUMPOUT fault are beyond the scope of this invention. If the "NO" path from decision block 240 is taken or if a JUMPOUT fault is set at process block 242 the flow path returns to the START entry block 170 to recycle the method steps.

In this way, the method of the present invention controls the positioning of the synchronizers 24 of a dual clutch transmission 10. The method has the advantage of providing control over the synchronizers 24 so that their movement is accurately and finely controlled and their positions are constantly monitored. Specifically, the method provides for the movement of the synchronizers 24 in and out of engagement with the gear sets and includes repetitive control that provides for a recycling of the method steps until the desired action is achieved even if the synchronizers 24 do not complete their commanded movement on the first attempt. The method also accurately distinguishes between a full engagement position, a pre-determined minimum engagement position, and a pre-determined jumpout condition in which loss of synchronizer engagement is eminent.

The method also provides for constant monitoring and control of the neutral positions of the synchronizers 24 and avoids drift conditions where a neutralized but errant synchronizer 24 could drift into non-commanded contact with a gear set causing interference and potential damage. Thus, the method of the present invention not only monitors for drift but also corrects for it by moving the synchronizer 24 back to its neutral position.

In addition, the method also provides for constant monitoring and control of the engaged positions of the synchronizers 24 and avoids jumpout events where a synchronizer 24 could slip out of engagement potentially causing damage and loss of vehicle driving torque. When any synchronizer 24 is first commanded to be engaged, the method provides that the synchronizer 24 is moved to a full engagement position then monitors the synchronizer 24 as it transfers torque in the transmission 10 to prevent a jumpout condition. Thus, the method of the present invention not only monitors the synchronizers 24 for movement out of full engagement toward a jumpout but also corrects for it by moving the synchronizer 24 back to its full engagement position.

Finally, the method provides for fault monitoring of the operation of the synchronizers 24 of the dual clutch transmission 10 so that the failure of a synchronizer 24 to engage or disengage will provide a fault to the electronic control unit overseeing transmission operation allowing for a partial degraded operation of the transmission if desired. In this way, the method of the present invention provides for accurate and consistent control over the operation of the synchronizers 24 in a dual clutch transmission 10 during engagement, during shifting, and during neutral conditions.

To this end, a cyclical monitoring and control loop for the positioning of the synchronizers 24 is established during the normal operation of the dual clutch transmission 10 by the method of the present invention. The method utilizes the shift actuator monitoring steps of the MONITORING sub-routine 168 in interaction with the APPLY and RELEASE synchronizer positioning sub-routines 164 and 166 to overcome the disadvantages of conventional control methods. The present invention provides the manual style synchronizers 24 of the dual clutch transmission 10 with the necessary monitoring and control while they are engaged to prevent the synchronizers 24 from slipping out of full engagement and working free while transferring torque, or from drifting out of there neutral positions causing inference and damage.

The invention has been described in an illustrative manner. It is to be understood that the terminology which has been used is intended to be in the nature of words of description rather than of limitation. Many modifications and variations of the invention are possible in light of the above teachings. Therefore, within the scope of the claims, the invention may be practiced other than as specifically described.

We claim:

1. A method of controlling the positioning of a plurality of synchronizers of a dual clutch transmission to selectively engage and disengage various gears sets, and a plurality of shift actuators adapted to move the synchronizers, said method including the steps of:

initiating a control routine to move at least one synchronizer to a pre-determined full engagement position with a gear set;

monitoring the positions of all engaged synchronizers to sense when the engaged synchronizers have slipped out of the pre-determined full engagement position;

reinitiating the control routine to move an engaged synchronizer back into the pre-determined full engagement position when the synchronizer slips out beyond a pre-determined minimum engagement position; and monitoring the position of the synchronizer to ensure that it returns to the pre-determined full engagement position.

2. A method as set forth in claim 1 wherein the step of monitoring the position of the engaged synchronizers further includes the steps of:

determining if a jumpout error flag has been set;

determining if any engaged synchronizer has slipped out between the pre-determined minimum engaged position and a pre-determined jumpout position when the jumpout error flag is not set;

determining if the position of any engaged synchronizer has slipped out to or beyond the pre-determined jumpout position when none of the engaged synchronizers indicate that their position is between the pre-determined minimum engaged position and the pre-determined jumpout position; and setting a jumpout fault for any engaged synchronizer has slipped out to or beyond the pre-determined jumpout position.

3. A method as set forth in claim 1 wherein the step of monitoring the position of the engaged synchronizers further includes the steps of:

determining if a jumpout error flag has been set;

determining if any engaged synchronizer has slipped out to a position between the pre-determined minimum engaged position and a pre-determined jumpout position when the jumpout error flag is not set; and setting the jumpout error flag and reinitiating the control routine to move the synchronizer back into the pre-determined full engagement position when an engaged synchronizer has slipped out to a position between the pre-determined minimum engaged position and the pre-determined jumpout position.

4. A method as set forth in claim 3 wherein the step of monitoring the position of the engaged synchronizers further includes the steps of:

determining if any engaged synchronizer has slipped out beyond the pre-determined jumpout position when none of the engaged synchronizer have slipped between the pre-determined minimum engaged position and pre-determined jumpout position;

setting a jumpout fault and returning to the beginning of the control routine when any engaged synchronizer has slipped out beyond the pre-determined jumpout position; and returning to the beginning of the control routine when none of the engaged synchronizers have slipped out beyond the pre-determined jumpout position.

5. A method as set forth in claim 3 wherein the step of reinitiating the control routine to initiate a shift actuator to move the synchronizer back into the pre-determined full engagement position further includes the steps of:

determining if an attempt counter has exceeded a pre-determined maximum;

moving the synchronizer back to the pre-determined full engagement position when the attempt counter has not exceeded the pre-determined maximum;

determining if the synchronizer has reached the pre-determined full engagement position; and clearing the attempt counter when the synchronizer has reached the pre-determined full engagement position.

6. A method as set forth in claim 5 wherein the step of reinitiating the control routine to initiate the shift actuator to move the synchronizer back into the pre-determined full engagement position further includes the steps of:

incrementing a timer when turning on the shift actuator to move the synchronizer back to the pre-determined full engagement position when the attempt counter has not exceeded the pre-determined maximum;

determining if the synchronizer has reached the pre-determined full engagement position;

determining if the timer has exceeded a pre-determined maximum elapsed time when it is determined that the synchronizer has not reached the pre-determined full engagement position; and setting a blockout error flag when the timer has exceeded a pre-determined maximum elapsed time and the synchronizer has not reached the pre-determined full engagement position.

7. A method as set forth in claim 5 wherein the step of reinitiating the control routine to move the synchronizer back into the pre-determined full engagement position further includes the step setting a fault for the synchronizer if it is determined that the attempt counter has exceeded the pre-determined maximum.

8. A method of controlling the positioning of a plurality of synchronizers of a dual clutch transmission to selectively engage and disengage various gears sets, and a plurality of shift actuators adapted to move the synchronizers, said method includes the steps of:

initiating a control routine to move at least one synchronizer to a pre-determined neutral and disengaged position;

monitoring the position of all disengaged synchronizers to sense when a disengaged synchronizer has drifted away from the pre-determined neutral position;

reinitiating the control routine to move the disengaged synchronizer back to the pre-determined neutral position when the synchronizer drifts beyond a pre-determined neutral hysteresis position; and monitoring the position of the synchronizer to ensure that the disengaged synchronizer is returned to the pre-determined neutral position.

9. A method as set forth in claim 8 wherein the step of monitoring the position of the disengaged synchronizers further includes the steps of:

determining if a drift error flag has been set;

determining if any of the disengaged synchronizers have drifted to a position that is greater than the pre-determined neutral hysteresis position when the drift error flag is not set;

returning to the beginning of the control routine if none of the disengaged synchronizers have drifted beyond the pre-determined neutral hysteresis position.

10. A method as set forth in claim 8 wherein the step of monitoring the position of the disengaged synchronizers further includes the steps of:

determining if the drift error flag has been set;

determining if any of the disengaged synchronizers have drifted to a position that is greater than the pre-determined neutral hysteresis position when the drift error flag is not set;

setting the drift flag if any of the disengaged synchronizers have drifted beyond the pre-determined neutral hysteresis position; and reinitiating the control routine to move the synchronizer back to the pre-determined neutral position.

11. A method as set forth in claim 10 wherein the step of reinitiating the control routine to move the synchronizer back into the pre-determined neutral position further includes the steps of:

determining if an attempt counter has exceeded a pre-determined maximum;

moving the synchronizer back to the pre-determined neutral position when the attempt counter has not exceeded the pre-determined maximum;

determining if the synchronizer has reached the pre-determined neutral position; and clearing the attempt counter when the synchronizer has reached the pre-determined neutral position.

12. A method as set forth in claim 11 wherein the steps further include the step of setting a fault for the synchronizer when it is determined that the attempt counter has exceeded the pre-determined maximum.

13. A method of controlling the positioning of a plurality of synchronizers of a dual clutch transmission to selectively engage and disengage various gears sets, and a plurality of shift actuators adapted to move the synchronizers, said method includes the steps of:

initiating a control routine within an electronic control unit;

determining whether the existing state of each shift actuator is the desired state for each shift actuator;

determining if a jumpout flag from a monitoring routine is set;

determining if a drift flag from the monitoring routine is set;

determining if a shift actuator must be disengaged or neutralized when an existing state of the shift actuator is different than the desired state for the shift actuator;

initializing a release routine when the shift actuator must be disengaged or neutralized;

determining if the shift actuator must be engaged when the existing state of the shift actuator is different than the desired state for the shift actuator; and initializing an apply routine when the shift actuator must be engaged.

14. A method as set forth in claim 13 wherein the steps further include the step of initiating a monitoring routine when the existing state of each shift actuator is the same as the desired state for each shift actuator.

15. A method as set forth in claim 13 wherein the step of determining whether the shift actuator is currently engaged when the shift actuator is commanded to move further includes the step of initiating a monitoring routine when the commanded shift actuator is currently engaged.

16. A method as set forth in claim 13 wherein the step of determining if a jumpout flag from a monitoring routine is set further includes the step of reinitiating the monitoring routine when the jumpout flag is set.

17. A method as set forth in claim 13 wherein the step of determining if a drift flag from the monitoring routine is set further includes the step of reinitiating the monitoring routine when the drift flag is set.

18. A method of controlling the positioning of a plurality of synchronizers of a dual clutch transmission to selectively engage and disengage various gears sets, and a plurality of shift actuators adapted to move the synchronizers, said method includes the steps of:

initiating a control routine to move at least one synchronizer to a pre-determined full engagement position;

monitoring the positions of all engaged synchronizers to sense when a synchronizer has slipped out of the pre-determined full engagement position;

reinitiating the control routine to move an engaged synchronizer back to the pre-determined full engagement position when the engaged synchronizer slips out to a pre-determined minimum engagement position;

monitoring the position of the engaged synchronizer to ensure that it returns to the pre-determined full engagement position;

initiating a control routine within an electronic control unit to move at least one synchronizer to a pre-determined neutral and disengaged position;

monitoring the position of all disengaged synchronizers to sense when a disengaged synchronizer has drifted away from the pre-determined neutral position;

reinitiating the control routine to move the synchronizer back to the pre-determined neutral position when the disengaged synchronizer drifts beyond a pre-determined neutral hysteresis position; and monitoring the position of the disengaged synchronizer to ensure that it returns to the pre-determined neutral position.

19. A method as set forth in claim 18 wherein the step of monitoring the position of the synchronizer to ensure that it returns to the pre-determined full engagement position further includes;

reinitiating the control routine to move the synchronizer back to the pre-determined full engagement position when the synchronizer fails to return to the pre-determined full engagement position;

determining when a timer has reached its pre-determined maximum elapsed time;

discontinuing the reinitiating of the control routine when the synchronizer fails to return to the pre-determined full engagement position and when the timer has reached its pre-determined maximum elapsed time;

incrementing an attempt counter when the timer has reached its maximum and the reinitiation is discontinued;

resetting the timer and reinitiating the control routine to move the synchronizer back to the pre-determined full engagement position when the attempt counter has been incremented;

determining when the attempt counter has reached a pre-determined maximum count; and setting a fault and discontinuing the reinitiation of the control routine when the attempt counter has reached its pre-determined maximum and the synchronizer has failed to return to the pre-determined full engagement position.

20. A method as set forth in claim 18 wherein the step of monitoring the position of the synchronizer to ensure that it returns to the pre-determined neutral position further includes;

reinitiating the control routine to move the synchronizer back to the pre-determined neutral position when the synchronizer fails to return to the pre-determined neutral position; and setting a fault and discontinuing the reinitiation of the control routine when the synchronizer fails to return to the pre-determined full engagement position and a timer has reached its pre-determined maximum elapsed time and an attempt counter has reached a pre-determined maximum.

* * * * *

UNITED STATES PATENT AND TRADEMARK OFFICE
CERTIFICATE OF CORRECTION

PATENT NO. : 6,883,394 B2
DATED : April 26, 2005
INVENTOR(S) : Koenig et al.

It is certified that error appears in the above-identified patent and that said Letters Patent is hereby corrected as shown below:

Column 16,
Line 32, after "a" insert -- DRIFT flag will be set and the ECU will attempt to move the shift actuator back to the neutral position. --.

Column 19,
Line 19, insert -- the -- before "pre-determined".

Signed and Sealed this

Twenty-seventh Day of December, 2005

JON W. DUDAS
*Director of the United States Patent and Trademark Office*